$La_2O_3 - SiO_2 - B_2O_3 + 10 Al_2O_3$

INVENTORS:
WALTER GEFFCKEN and MARGA FAULSTICH

By Burgess, Dinklage & Sprung
ATTORNEYS $La_2O_3 - SiO_2 - B_2O_3 + 13\,Al_2O_3$ $La_2O_3-SiO_2-B_2O_3+16Al_2O_3$

United States Patent Office 3,174,871
Patented Mar. 23, 1965

3,174,871
GLASS CONTAINING LANTHANUM BOROSILICATE AND RICH IN ALUMINUM OXIDE
Walter Geffcken and Marga Faulstich, Mainz, Germany, assignors to Jenaer Glaswerk Schott & Gen., Mainz, Germany, a German corporation
Filed July 27, 1959, Ser. No. 829,721
Claims priority, application Germany, Aug. 7, 1958, J 15,203
6 Claims. (Cl. 106—54)

The present invention relates to a glass composition containing lanthanum borosilicate and being rich in aluminum oxide.

There have been prior disclosures of glass compositions which have a high content of rare earths as well as aluminum oxide and silicic acid, and attain high $n_d$ and $\nu$-values and a very good chemical stability. There have also been disclosures of glass compositions which, aside from a content of $ThO_2$ and $La_2O_3$ together amounting up to 45% by weight, a content of at least 30% by weight of $B_2O_3$, and a content of 13 to 25% by weight in metals, preferably of the bivalent type, have an additional content of $Al_2O_3$ of up to 10% by weight. The refractive index of these glass compositions was relatively low and in any case less than 1.70.

According to the present invention, it has now unexpectedly been found that in glass compositions which also contain boric acid and 7 to 21% by weight of aluminum oxide, the content of lanthanum oxide can be raised to very high values of at least 50% by weight, and even up to approximately 67% by weight, if these compositions have a content of at least 7% by weight of $SiO_2$ and a content of boric acid of more than 6% by weight. It is then possible to attain very high $n_d$-values as well as high or even very high $\nu$-values, that is, a combination which is of the greatest importance for the construction of optical systems.

Such glass compositions are in this respect far superior to the first mentioned glass compositions of rare earths, $Al_2O_3$, and $SiO_2$ which do not have any content of boric acid. On the other hand, they have the same excellent chemical stability as these compositions. Thus, for example, it is possible to produce stable glass compositions with an $n_d$-value of 1.794 and a $\nu$-value of 47.

These new glass compositions are also more easily melted than those without boric acid, since they require lower melting temperatures and are more easily refined.

The peculiar form of the stability range of the glass compositions according to the invention will be illustrated in the accompanying drawings by means of a few three-component diagrams, in which FIGURE 1 shows, in triangular coordinates, the three-component diagram of $La_2O_3$, $SiO_2$, and $B_2O_3$ with a constant content of 10% by weight of $Al_2O_3$;

FIGURE 3 shows the same with a content of 16% by weight of $Al_2O_3$; while

Figure 1:
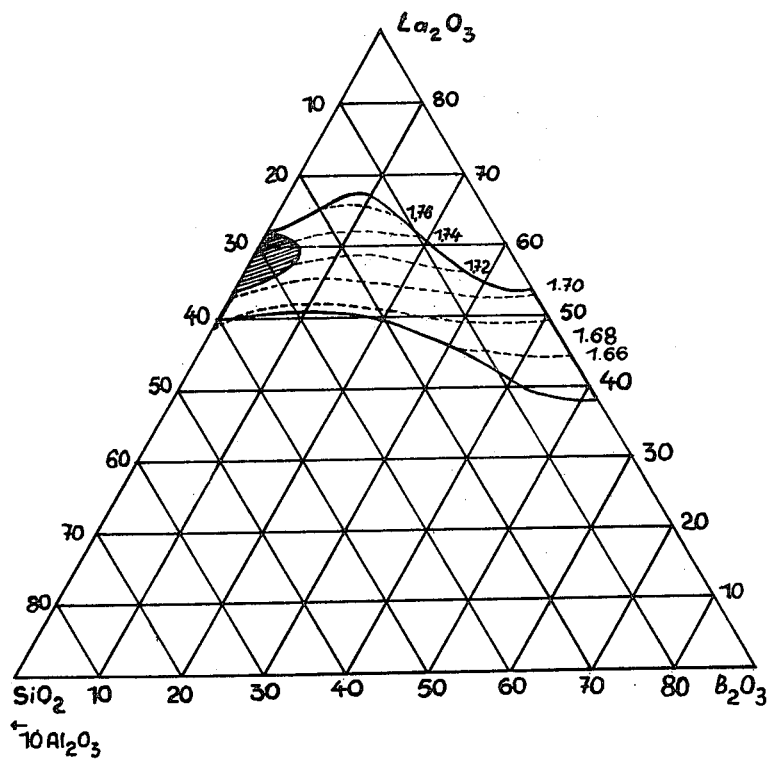
Figure 2:
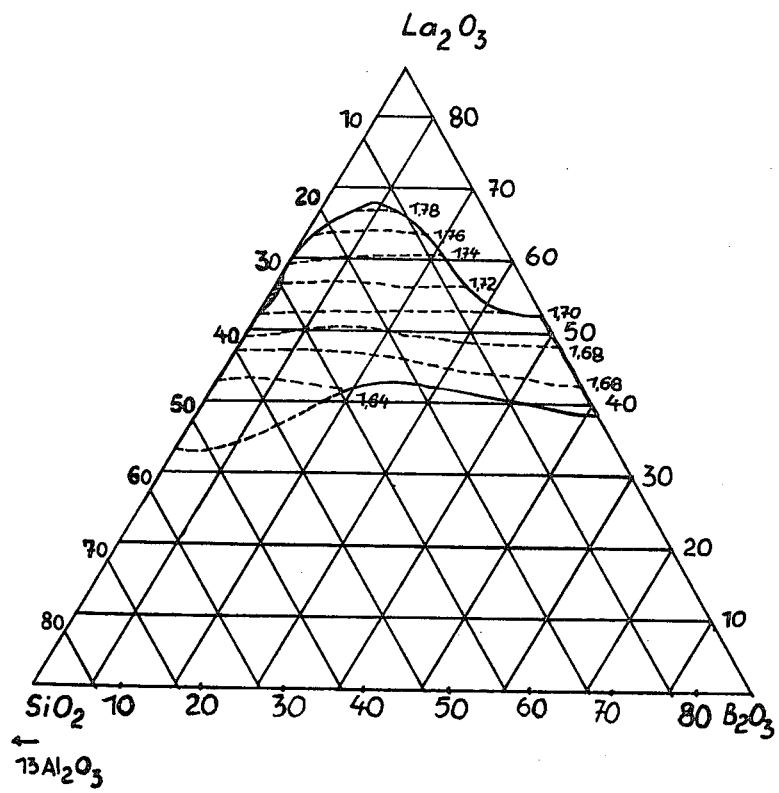
FIGURE 2 shows the same with a content of 13% by weight of $Al_2O_3$.
Figure 3:
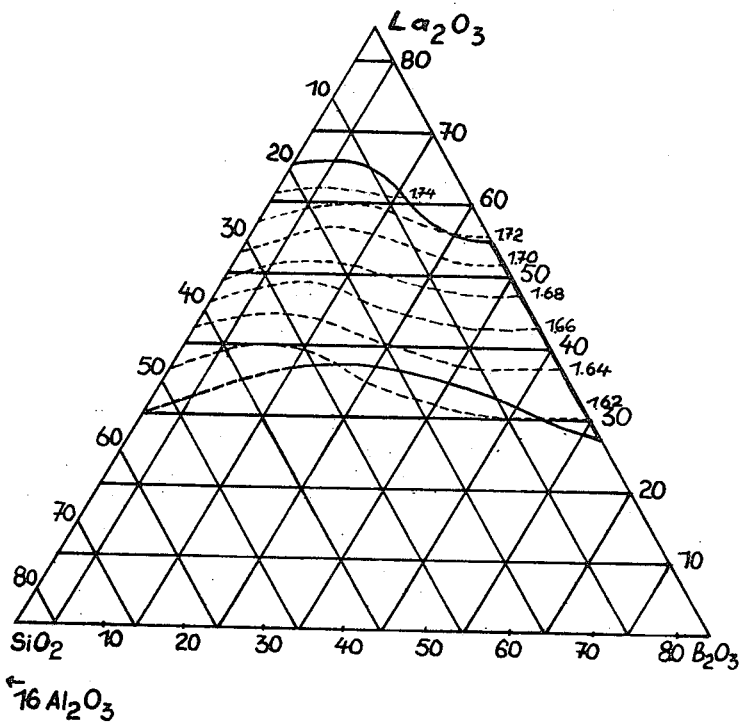

FIGURES 1 to 3 clearly indicate the steep ascent of the lanthanum content if more than 5% by weight of $SiO_2$ are added, with the result that at a content of $Al_2O_3$ of 10 to 13% by weight, the content of lanthanum oxide may be increased to 56% by weight, and at a content of $Al_2O_3$ of 16% by weight to 61% by weight, provided the compositions contain the minimum limit in $SiO_2$ of 7% by weight. The content in boric acid is then the resulting residue of 27 to 24% or 16% by weight, respectively.

It has further been found that the best possible optical position may, however, only be attained if the content in silicic acid will be further increased. Thus, for example, at an $Al_2O_3$ content of 10% by weight the content in $SiO_2$ amounts to approximately 12% by weight, at an $Al_2O_3$ content of 13% by weight it amounts to 11% by weight, and at an $Al_2O_3$ content of 16% by weight it amounts to 9% by weight. Consequently, the percentage by weight of $SiO_2$ equals 16.5–45% by weight of $Al_2O_3$.

The lower limit of $SiO_2$ of 7% by weight is attained according to the above formula with an $Al_2O_3$ content of 21% by weight. This value thus constitutes the upper limit of the $Al_2O_3$ content of the glass compositions according to the invention. Although stable and chemically resistant glasses may also be attained with higher $Al_2O_3$ contents, the $\nu$-value will then be reduced so considerably that the expense involved by the high $La_2O_3$ contents will be too high in comparison to the advantages attained, and more inexpensive materials together with lower $Al_2O_3$ contents will then usually be preferred.

The mentioned lower limit of $B_2O_3$ of 6% by weight is indicated by the fact that at a reduction of the boric acid content to less than 6%, there will be a noticeable reduction in the receptivity for $La_2O_3$. Furthermore, in the vicinity of 54% by weight of $La_2O_3$ and $B_2O_3$ contents of 0 to 5% by weight there will be a strong inclination toward crystallization, as may be seen by the shaded area in FIGURE 1. The diagrams shown in FIGURES 1 to 3 indicate distinct maxima of the $La_2O_3$ content, especially with the $Al_2O_3$ contents of 10 to 13% by weight. It was further found that, at a given $n_d$-value, the $\nu$-content will drop considerably if the boric acid content is lowered to a point below the limit of 6% by weight.

If very high refractive indices are desired, as are attainable with the highest $La_2O_3$ contents of 65% by weight and more, the boric acid content should be approximately equal to the silicic acid content.

If the refractive indices do not need to be quite as high, but the $\nu$-values with a given refraction should be as high as possible, the composition is preferably prepared so that, at a given refraction (the curves for a constant refraction being indicated in the drawings), the boric acid content will be made as high as possible and as closely as possible to the crystallization limit, as indicated. The boric acid content should therefore be in all these cases higher than the silicic acid content.

The upper limit of $B_2O_3$ may be easily determined purely by calculation by deducting the lower limits of the content in $La_2O_3$, $Al_2O_3$, and $SiO_2$ from the total of 100 of all components. It then amounts to 36% by weight. Similarly, the upper limit of $SiO_2$ will thus be determined by calculation as being 37% by weight.

The glass compositions according to the invention may thus be specified as follows:

|  | Percent by weight |
|---|---|
| $La_2O_3$ | 50 to 67 |
| $Al_2O_3$ | 7 to 21 |
| $SiO_2$ | 7 to 37 |
| $B_2O_3$ | 6 to 36 | in which the content of $B_2O_3$ is then preferably made higher than that of $SiO_2$.

Very remarkable optical positions may be attained with the glass compositions according to the invention if the $La_2O_3$ content is increased above 55% by weight. In extreme glass types, the $La_2O_3$ content should even exceed 60% by weight.

At a content in $La_2O_3$ of 55% or 60%, the respective limits of the $SiO_2$ content lie, according to the above calculation, at 7 to 32% or 7 to 27% by weight, and the boric acid content at 6 to 31% or 6 to 26% by weight, respectively.

Of course, certain quantities of other substances may also be added to the glass compositions according to the invention. Thus, for example, the $La_2O_3$ may be partly replaced by CdO and/or ZnO and/or alkaline earths and/or alkalies and/or PbO and/or $TiO_2$. However, at such a partial replacement by ZnO, alkaline earths, and alkalies, the residual $La_2O_3$ content should not be less than 50% by weight, and at a replacement by CdO and PbO and $TiO_2$ it should not be less than 45% and preferably not less than 50% by weight, while the silicic acid content of a glass containing CdO or ZnO should preferably be increased to at least 10% by weight since the crystallization limit is shifted in such glass compositions toward higher $SiO_2$ contents.

In these new glass compositions it is also possible to replace a part of the $Al_2O_3$ by amounts of up to 5% by weight of $ZrO_2$, $Ta_2O_5$, $WO_3$, wherein the total of these components should not exceed 10% by weight and the $Al_2O_3$ content should never be less than 7% by weight.

Since in glass compositions containing $Ta_2O_5$ and $ZrO_2$ the limit of the stable glass range is shifted toward smaller silicic acid contents, the condition that the $SiO_2$ content should be higher than 7% should therefore be generally fulfilled by complying with the formula:

$$SiO_2 + \frac{Ta_2O_5 + ZrO_2}{4} \geq 7\%$$

The influence of niobium is similar to that of tantalum. A part of the $La_2O_3$ may also be replaced by PbO. This results in glass compositions with smaller $\nu$-values which lie within the range of the so-called lanthanum flint-glass compositions. They may be very easily melted and refined because of the simultaneous application in these compositions of PbO and $B_2O_3$. Also, because of the enlargement of the glass range relative to otherwise similar glass compositions which are free of boric acid, it is possible to produce glass compositions with a very high refractive index. By changing the ratio of lanthanum oxide to PbO, the $\nu$-values may be very easily adjusted to any particular value within very wide limits. The same applies to additions of $TiO_2$; however, the amount thereof added should not exceed 5% by weight since a yellow-brownish discoloration would otherwise occur.

The accompanying tables show a compilation of numerous examples of the glass compositions according to the invention.

For producing the new glass compositions, the raw materials should be applied in as pure a condition as possible, and $La_2O_3$, $SiO_2$, CdO, ZnO, $WO_3$, $ZrO_2$, and $Ta_2O_5$ are preferably applied in the form of oxides, while $Al_2O_3$ is applied in the form of a hydrated oxide, and $B_2O_3$ in the form of boric acid hydrate. These materials should be intimately mixed and melted, preferably in a platinum crucible, at temperatures of 1300° to 1500° C.

The lowest temperature applies to the composition No. 7 in Table I with a content in $SiO_2+Al_2O_3$ of only 19% and a $B_2O_3$ content of 21%. The highest temperatures are required for the compositions with a content in $ZrO_2$ and $Ta_2O_5$.

The refining temperature preferably lies between 1360° and 1550° C. Naturally, the highest refining temperatures are also required for the glass compositions with a content of $ZrO_2$ and $Ta_2O_5$. Generally, however, a refining temperature of 1400° to 1420° will be sufficient.

The molten mixtures are thereafter stirred until they attain the viscosity necessary for casting; and they are cast in the usual manner into preheated metallic molds and then cooled.

Figure 4:
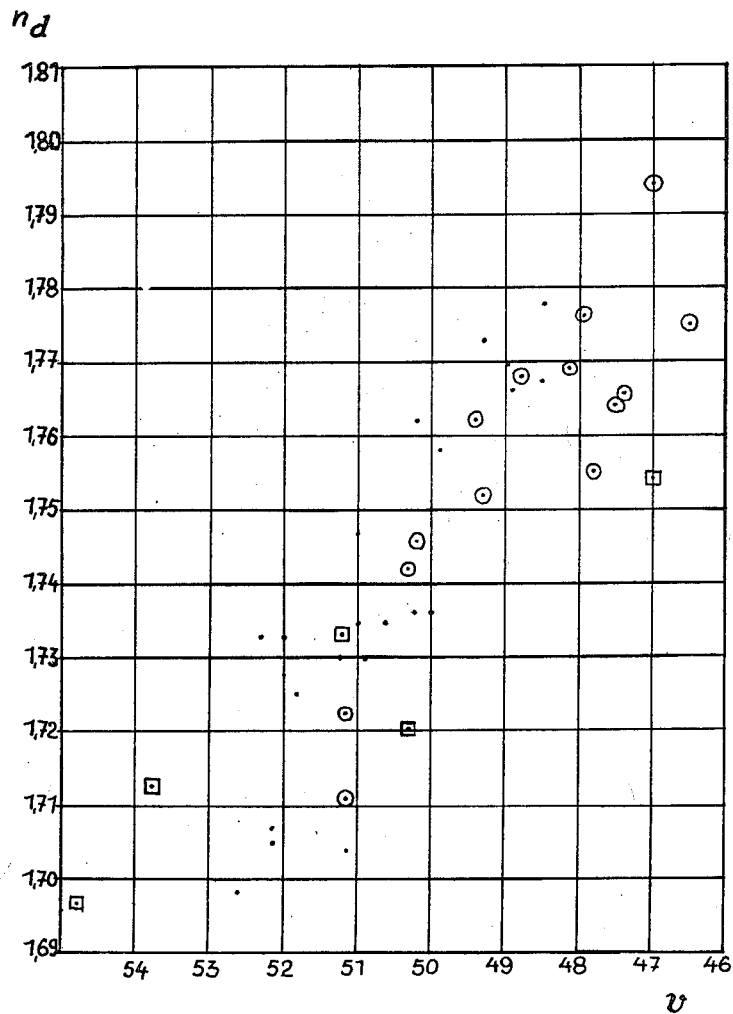
FIGURE 4 shows in an $n_d$-$\nu$ diagram the optical position of a few examples of the new glass compositions.

With reference to the $n_d$-$\nu$ diagram according to FIGURE 4, it may be added that the values indicated therein by squares correspond to the conventional glass compositions with the most extreme optical positions which are commercially obtainable, while the values indicated by dots correspond to the examples stated in Table I and those indicated by circles to those stated in Table II.

Table I

[Components in percent by weight]

| No. | $La_2O_3$ | $Al_2O_3$ | $SiO_2$ | $B_2O_3$ | $n_d$ | $\nu$ |
|---|---|---|---|---|---|---|
| 1 | 63.0 | 8.0 | 13.0 | 16.0 | 1.747 | 51.0 |
| 2 | 60.0 | 8.0 | 10.0 | 22.0 | 1.733 | 52.3 |
| 3 | 60.0 | 8.0 | 17.0 | 15.0 | 1.730 | 51.2 |
| 4 | 67.0 | 10.0 | 13.0 | 10.0 | 1.773 | 49.3 |
| 5 | 65.0 | 10.0 | 15.0 | 10.0 | 1.758 | 49.9 |
| 6 | 65.0 | 10.0 | 12.0 | 13.0 | 1.762 | 50.2 |
| 7 | 60.0 | 10.0 | 9.0 | 21.0 | 1.733 | 52.0 |
| 8 | 60.0 | 10.0 | 12.0 | 18.0 | 1.733 | 51.9 |
| 9 | 60.0 | 10.0 | 23.0 | 7.0 | 1.730 | 50.9 |
| 10 | 55.0 | 10.0 | 20.0 | 15.0 | 1.698 | 52.6 |
| 11 | 67.0 | 13.0 | 13.0 | 7.0 | 1.778 | 48.5 |
| 12 | 65.0 | 13.0 | 12.0 | 10.0 | 1.770 | 49.0 |
| 13 | 60.0 | 13.0 | 9.0 | 18.0 | 1.735 | 51.0 |
| 14 | 60.0 | 13.0 | 18.0 | 9.0 | 1.736 | 50.6 |
| 15 | 54.0 | 13.0 | 18.0 | 15.0 | 1.705 | 52.2 |
| 16 | 54.0 | 13.0 | 17.9 | 6.1 | 1.704 | 51.2 |
| 17 | 65.0 | 16.0 | 9.0 | 10.0 | 1.766 | 48.9 |
| 18 | 65.0 | 16.0 | 12.9 | 6.1 | 1.767 | 48.5 |
| 19 | 60.0 | 16.0 | 9.0 | 15.0 | 1.725 | 51.8 |
| 20 | 55.0 | 16.0 | 9.0 | 20.0 | 1.707 | 52.2 |
| 21 | 60.0 | 20.0 | 10.0 | 10.0 | 1.736 | 50.2 |
| 22 | 60.0 | 20.0 | 13.9 | 6.1 | 1.736 | 50.0 |

Table II

[Components in percent by weight]

| No. | $La_2O_3$ | $Al_2O_3$ | $SiO_2$ | $B_2O_3$ | | $n_D$ | $\nu$ |
|---|---|---|---|---|---|---|---|
| 1 | 52.0 | 10.0 | 15.0 | 10.0 | 13.0 CdO | 1.755 | 47.8 |
| 2 | 60.0 | 13.0 | 12.0 | 10.0 | 5.0 ZnO | 1.746 | 50.2 |
| 3 | 62.0 | 13.0 | 12.0 | 8.0 | 5.0 $WO_3$ | 1.775 | 46.6 |
| 4 | 60.0 | 13.0 | 12.0 | 10.0 | 5.0 $WO_3$ | 1.764 | 47.5 |
| 5 | 60.0 | 13.0 | 8.0 | 14.0 | 5.0 $WO_3$ | 1.766 | 47.4 |
| 6 | 65.0 | 13.0 | 7.0 | 10.0 | 5.0 $Ta_2O_5$ | 1.794 | 47.0 |
| 7 | 63.0 | 13.0 | 9.0 | 10.0 | 5.0 $Ta_2O_5$ | 1.776 | 48.0 |
| 8 | 60.0 | 13.0 | 8.0 | 14.0 | 5.0 $Ta_2O_5$ | 1.752 | 49.3 |
| 9 | 60.0 | 13.0 | 12.0 | 10.0 | 5.0 $ZrO_2$ | 1.751 | 49.3 |
| 10 | 58.0 | 13.0 | 17.0 | 7.0 | 5.0 $ZrO_2$ | 1.769 | 48.2 |
| 11 | 60.0 | 13.0 | 7.0 | 15.0 | 5.0 $ZrO_2$ | 1.768 | 48.8 |
| 12 | 57.0 | 13.0 | 5.0 | 20.0 | 5.0 $ZrO_2$ | 1.762 | 49.4 |
| 13 | 55.0 | 13.0 | 7.0 | 20.0 | 5.0 $ZrO_2$ | 1.742 | 50.3 |
| 14 | 50.0 | 13.0 | 10.0 | 22.0 | 5.0 $ZrO_2$ | 1.722 | 51.1 |
| 15 | 50.0 | 13.0 | 22.0 | 10.0 | 5.0 $ZrO_2$ | 1.711 | 51.2 |

Table III

[Components in percent by weight]

| No. | $La_2O_3$ | $Al_2O_3$ | $SiO_2$ | $B_2O_3$ | BaO | $ZrO_2$ | PbO | $TiO_2$ | $Ta_2O_5$ | $n_d$ | $\nu$ |
|---|---|---|---|---|---|---|---|---|---|---|---|
| 1 | 51.3 | 13.15 | 20.8 | 9.0 | 0.7 | 4.75 | 0.3 | | | 1.7216 | 50.3 |
| 2 | 63.0 | 15.0 | 12.0 | 10.0 | | | | | | 1.7532 | 49.75 |
| 3 | 48.2 | 13.0 | 13.9 | 19.4 | 0.6 | 2.1 | | 2.8 | | 1.7111 | 48.28 |
| 4 | 61.0 | 13.0 | 9.0 | 10.0 | | | | | 7.0 | 1.7895 | 46.72 |
| 5 | 51.3 | 11.6 | 19.6 | 7.2 | 3.0 | | 7.3 | | | 1.7202 | 47.0 |

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A lanthanum borosilicate glass containing aluminum oxide and having an $n_d$ value of from about 1.67–1.80 and a $\nu$ value of from about 40–55 consisting of 50–67% by weight of $La_2O_3$, 7–21% by weight of $Al_2O_3$, 7–37% by weight of $SiO_2$, and 6–36% by weight of $B_2O_3$.

2. A glass as claimed in claim 1 having an $n_d$ value of from about 1.70–1.80 and a $\nu$ value of from about 40–53 consisting of 55–67% by weight of $La_2O_3$, 7–21% by weight of $Al_2O_3$, 7–32% by weight of $SiO_2$, and 6–31% by weight of $B_2O_3$.

3. A glass as claimed in claim 1 having an $n_d$ value of from about 1.72–1.80 and a $\nu$ value of from about 40–52.5 consisting of 60–67% by weight of $La_2O_3$, 7–21% by weight of $Al_2O_3$, 7–27% by weight of $SiO_2$, and 6–26% by weight of $B_2O_3$.

4. A glass as claimed in claim 1 in which $B_2O_3$ is present in an amount greater than one-half the sum of the total of $B_2O_3$ and $SiO_2$ present in said glass.

5. A glass as claimed in claim 3 in which the $SiO_2$ is present in an amount equal to 16 minus 45% of said $Al_2O_3$ present.

6. A lanthanum borosilicate glass containing aluminum oxide and having an $n_d$ value of from about 1.67–1.80 and a $\nu$ value of from about 40–53 consisting of 50–67% by weight of $La_2O_3$, 7–21% by weight of $Al_2O_3$, 7–37% by weight of $SiO_2$, and 6–36% by weight of $B_2O_3$.

References Cited in the file of this patent

UNITED STATES PATENTS

| | | |
|---|---|---|
| 2,584,975 | Armistead | Feb. 12, 1952 |
| 2,805,166 | Loeffler | Sept. 3, 1957 |